(12) United States Patent
Tore

(10) Patent No.: US 6,252,908 B1
(45) Date of Patent: *Jun. 26, 2001

(54) METHOD AND DEVICE IN A COMMUNICATION SYSTEM

(75) Inventor: André Tore, Älvsjö (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,483

(22) PCT Filed: Jan. 30, 1998

(86) PCT No.: PCT/SE98/00138

§ 371 Date: Nov. 17, 1999

§ 102(e) Date: Nov. 17, 1999

(87) PCT Pub. No.: WO98/34368

PCT Pub. Date: Aug. 6, 1998

(30) Foreign Application Priority Data

Jan. 31, 1997 (SE) .................................................. 9700308

(51) Int. Cl.$^7$ ................................................. H04L 27/00
(52) U.S. Cl. .......................................... 375/259; 375/355
(58) Field of Search ................................. 375/260, 355, 375/259, 362, 364, 368, 369, 371, 373, 376

(56) References Cited

U.S. PATENT DOCUMENTS

| 3,815,034 | * | 6/1974 | Kato ..................................... 329/306 |
| 4,849,989 |  | 7/1989 | Kamerman . |
| 5,206,886 |  | 4/1993 | Bingham . |
| 5,901,180 | * | 5/1999 | Aslanis et al. ..................... 375/261 |

FOREIGN PATENT DOCUMENTS

| 0683576A1 | 11/1995 | (EP) . |
| 2 153 186 | 8/1985 | (GB) . |
| 2-76430 | 3/1990 | (JP) . |
| 95/03656 | 2/1995 | (WO) . |
| 95/19671 | 7/1995 | (WO) . |

* cited by examiner

Primary Examiner—Chi Pham
Assistant Examiner—Phuong Phu
(74) Attorney, Agent, or Firm—Burns, Doane, Swecker & Mathis, L.L.P.

(57) ABSTRACT

The present invention concerns a method and a device for the synchronization of a transmitter (1) and at least one receiver (3) in multi-carrier modulated communication systems in which FFT technology is used for the modulation and demodulation of data transmitted between the transmitter (1) and the receiver (3). According to the invention the transmitter (1) transmits synchronization symbols (15, 16) as training symbols (15, 16) at the beginning of a transmission, until a result is obtained that may indicate where a synchronization symbol starts. The result is used for the adjustment of the symbol rate in the receiver (3). Data symbols may then be transmitted after the synchronization symbols (15, 16).

14 Claims, 5 Drawing Sheets

METHOD AND DEVICE IN A COMMUNICATION SYSTEM

TECHNICAL FIELD

The present invention relates to a method and a device for recovery of sampling rate and symbol rate in multi-carrier modulated communication systems, preferably using copper wires as a transmission medium.

STATE OF THE ART

Multi-carrier modulation is a known method for transmitting broadband information over copper wire or radio connections. The information may be, for example, video, Internet or telephony. Very briefly explained, for example, the bits of a digitally encoded video signal that are to be transmitted, are encoded as complex numbers in a transmitter, before an Inverse Fast Fourier Transform (IFFT) is carried out.

The IFFT gives, in the modulation, a sum of orthogonal carriers or tones, the amplitudes and phase displacement of which are determined by the values and phases of the complex numbers. These carriers are then transmitted in time slots at constant time intervals and are called symbols. In a receiver a Fast Fourier Transform (FFT) is carried out instead. In this way, the original bits are retrieved. Attenuation and phase displacement may be easily compensated for, by multiplication by a complex number for each carrier.

Two similar methods in the above mentioned technology are Orthogonal Frequency Division Multiplex (OFDM), used in radio applications, and Discrete Multitone (DMT), which is used in copper wires.

In both cases the receiver must be able to adjust the correct sampling rate and to determine the beginning and the end of the transmitted symbols.

In WO 95/03656 OFDM is used. To adjust the symbol rate, a transmitter transmits synchronization frames at known intervals, that is, synchronization symbols having a pseudo random sequence of known frequencies and phase displacements, and also known time intervals in special time slots. The receiver carries out a number of FFT calculations over the position in time in which the synchronization frame is presumed to be found. For each FFT calculation a cross correlation calculation is made in the frequency plane, using the known frequency function of the synchronization frame. The correlation maximum is detected, which determines the time slot containing the synchronization frame.

SUMMARY OF THE INVENTION

The problem associated with transmitting synchronization symbols at known intervals is that it takes up time in which data could have been transmitted. Also, a complex procedure of cross correlation calculations is required to detect and analyze the synchronization symbols.

The object of the present invention is to solve the above problem by transmitting training symbols before the start of a data transmission. Each training symbol comprises at least a period of a pilot tone and is transmitted using 180° phase jumps between the symbols. The use of this simple training symbol makes it easy to detect the beginning and the end of the symbol. An FFT calculated over the length of a symbol gives the value zero at a maximally erroneous position, that is, with the phase jump in the middle of the calculation, and a maximum/minimum at the ideal position, that is, half way between two phase jumps. The simplest method is probably to look for the position in which the result of the FFT calculation is zero and then move a distance of half a symbol.

An advantage of the present invention is that the symbol rate may be restored in a fast and simple way even before the beginning of a data transmission. During the transmission it may then be sufficient to use a method known in the art for retrieving the sampling rate, because if something locks the sampling rate, the symbol rate is automatically kept constant. Another advantage is that the inventive method is simple and inexpensive to implement.

The invention will be described in more detail in the following, by means of preferred embodiments and with reference to the enclosed drawings.

BRIEF DESCRIPTION OF THE DRAWINGS

FIG. 2b is a timing diagram of the result of the FFT calculations according to FIG. 2a.

PREFERRED EMBODIMENTS

Multi-Carrier Modulation

Figure 1:
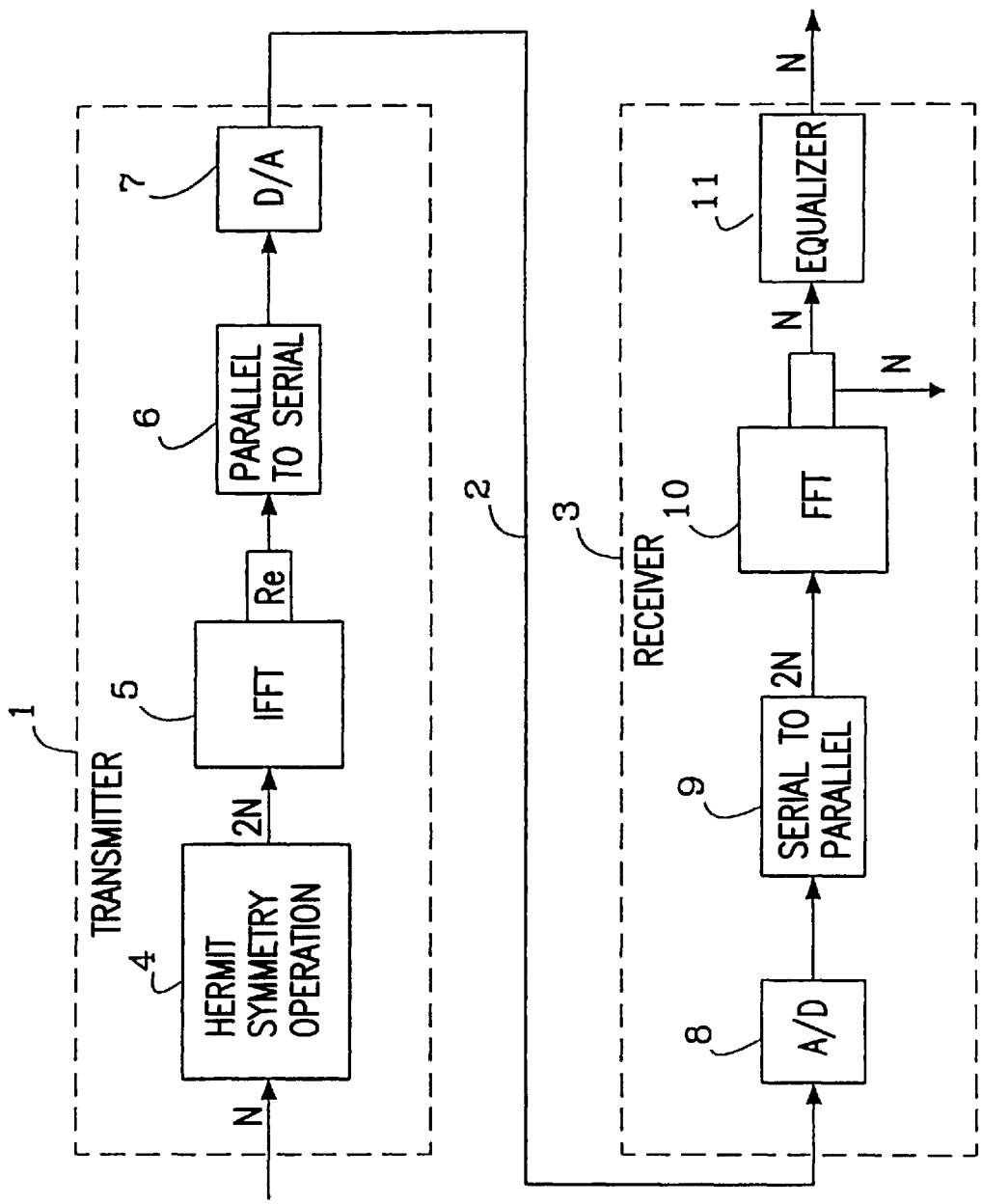
FIG. 1 is a block diagram of a prior art system for multi-carrier modulation.

FIG. 1 shows, schematically, how the main parts of a prior art system for multi-carrier modulation may look. In a transmitter 1 modulation of data bits, for example, from a digitally encoded video signal, is performed.

The bits to be transmitted are encoded in the transmitter 1 as N complex numbers before a hermit symmetry operation is carried out in a calculation block 4. 2N complex numbers are obtained having a symmetric real part and an asymmetric imaginary part.

An Inverse Fast Fourier Transform (IFFT) is then performed in an IFFT calculation unit 5, as a modulation. As the imaginary part becomes zero, it may be eliminated, and a real signal remains, which passes a parallel to serial converter 6 and a digital to analogue converter 7.

This gives a sum of orthogonal carriers or tones, the amplitudes and phases of which are determined by the values and phases of the original complex numbers. These carriers are then transmitted on a channel 2 at constant time intervals/time slots and are called symbols.

In a receiver 3 the data, in the opposite way, passes an analogue to digital converter 8, a serial to parallel converter 9 and an FFT calculation unit 10, in which an FFT is carried out, as a demodulation. This gives 2N complex numbers. For symmetry reasons, for example, the upper half of the 2N complex numbers may be discarded, leaving a number N of complex numbers.

Finally, an equalizer 11 is used, which compensates for attenuation and phase displacement by multiplying the different numbers with complex numbers so that finally the same data bits are obtained that were transmitted to begin with.

For each new symbol a discontinuity occurs in the carriers. To minimize the effects of this a so called cyclic prefix (not shown in the figure) may be used. This means copying the last part of the symbol and transmitting it just before the start of the symbol. In this way there is time for the effect of the discontinuity to fade out before the actual symbol starts.

Symbol Rate

In order to synchronize the transmitter 1 and the receiver 3, according to the invention first the sampling rate is adjusted so that the transmitter 1 and the receiver 3 sample at approximately the same times and so that the first sample taken is approximately zero. This will be described in more detail later.

Then training symbols are transmitted so that the receiver 3 will know where data symbols transmitted later will begin and end. It is appropriate to transmit the training symbols only at the beginning of the transmission. During transmission it may then be sufficient to use some method known in the art for restoration of the sampling rate, since if the sampling rate is locked the symbol rate is automatically maintained.

When both the sampling rate and the symbol rate have been restored, the transmitter 1 and the receiver 3 are synchronized and the data transmission may begin.

Figure 2A:
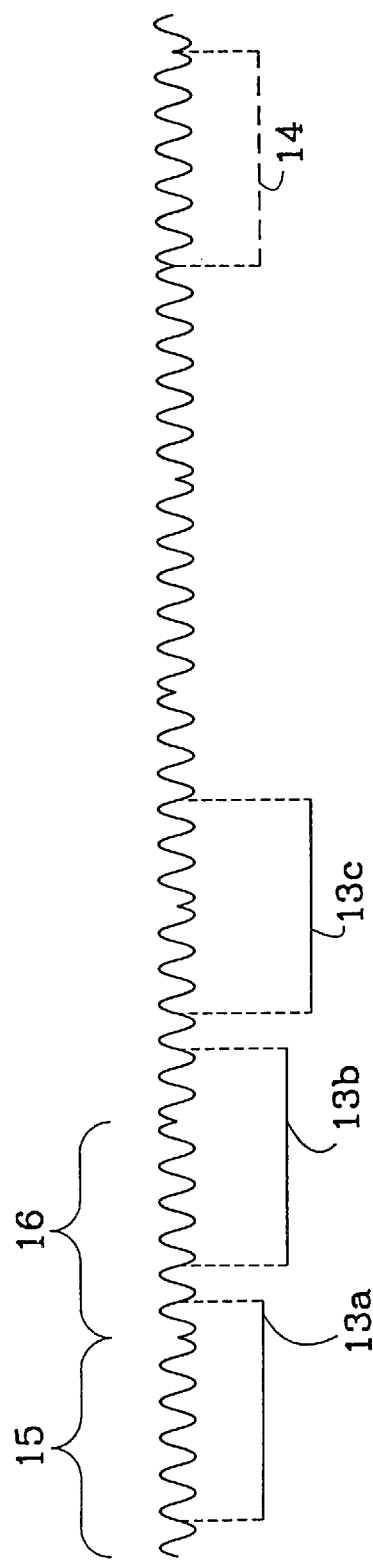
FIG. 2a is a timing diagram of the restoration of the symbol rate according to the invention.

FIG. 2a shows a training symbol 15 which, according to the invention, is used to restore the symbol rate. The training symbol 15 comprises a number of periods of a pilot tone or carrier, in this case, for the sake of illustration, six periods. This training symbol 15 is transmitted with a 180° phase jump for each new symbol so that every other symbol 16 is inverted.

Figure 2B:
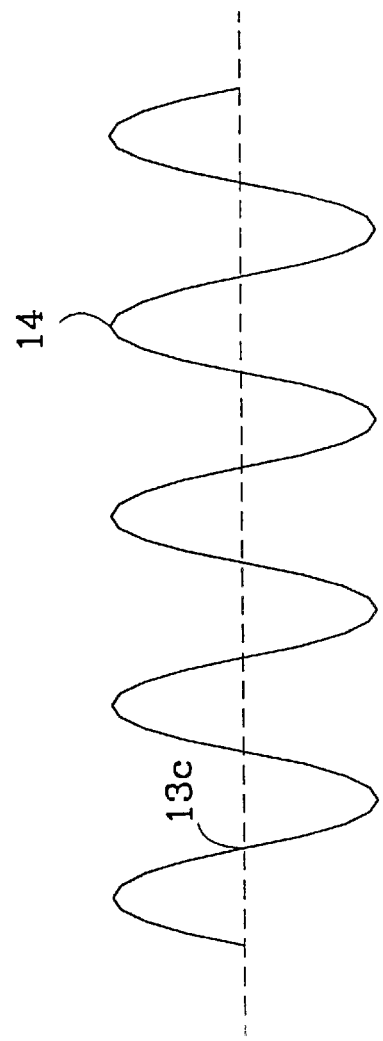

To detect the symbol position a series of time shifted FFT calculations 13a, 13b, 13c are carried out during a time interval of the same length as a training symbol according to FIG. 2a or in a similar way. The result of the FFT calculations 13a, 13b, 13c will then vary approximately as shown in FIG. 2b. The maximum and the minimum, respectively, of the result in FIG. 2b is achieved when the FFT calculation 14 in FIG. 2a is carried out exactly on a symbol or an inverted symbol, respectively, that is, in the desired position.

The maximum or minimum may, however, be difficult to detect. It is considerably less difficult to detect when the FFT calculation 13c is totally wrong, as the result then becomes zero. The most appropriate solution may therefore be to time shift the FFT calculations 13a, 13b, 13c until a value relatively close to zero is calculated and then indicate the start of a symbol half a symbol away from this.

Note that if a cyclic prefix is used, this must be accounted for. Depending on the direction in which it is desired to move to find the start of the symbol, either the distance moved should be half a symbol, as usual, or half a symbol plus the length of the cyclic prefix.

Figure 3:
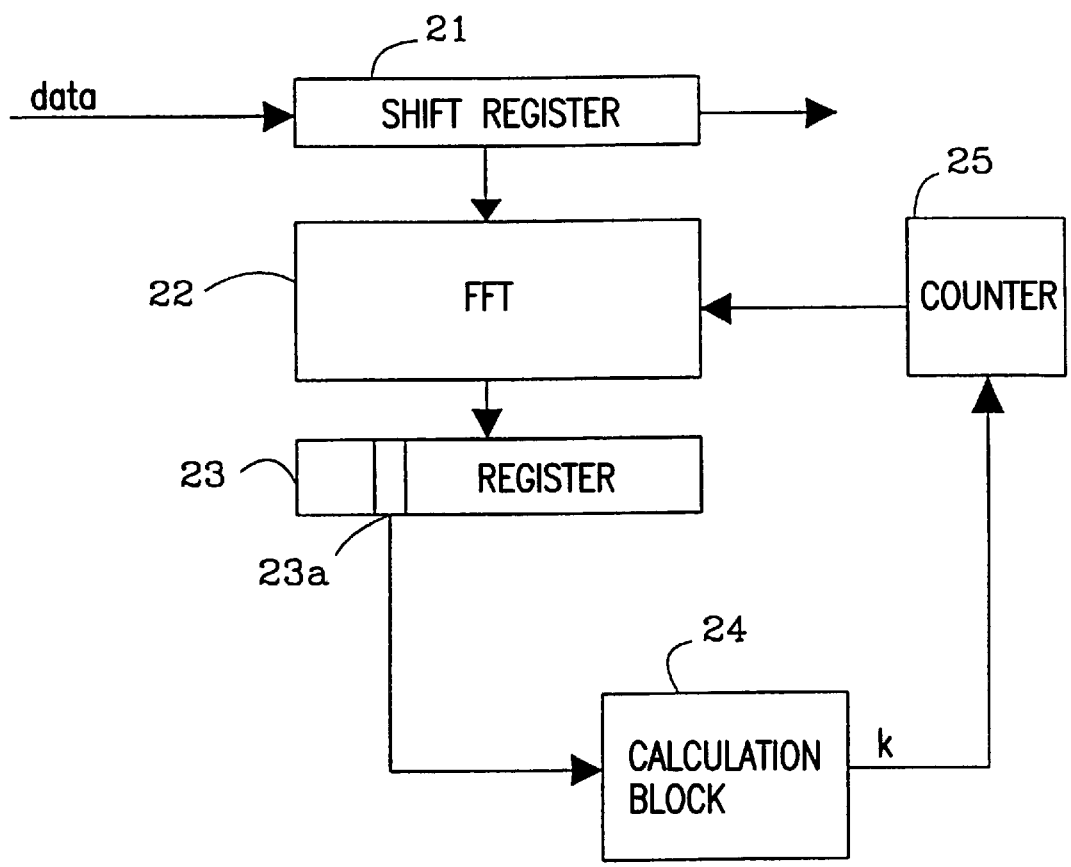
FIG. 3 is a block diagram of an embodiment of the restoration of the symbol rate according to the invention.

An example of the implementation of the embodiment for looking for the point where the FFT calculation becomes zero, is shown, schematically, in FIG. 3. The data sampled in the receiver is successively shifted into a shift register 21 or a similar set of memory units. From there, at different time intervals as shown below, parallel data corresponding to the length of a symbol is read to a calculation unit 22 in which an FFT calculation of the parallel data, for example 1024 points, is carried out.

The result of the FFT calculation is then placed in a register 23, from which data corresponding to the frequency of the phase jumping pilot tone may be retrieved in one of the memory positions 23a.

This data is forwarded to a calculation block 24, in which the imaginary component of the frequency of the pilot tone is preferably obtained for future adjustment to zero. During every other symbol the sign of the imaginary component is changed, or only every other symbol is calculated. This is done because every other symbol is inverted.

The imaginary component adjusted in this way is compared to a threshold value. If the value of the adjusted imaginary component is smaller than or equal to the threshold value, the calculation block 24 emits a check value k equal to zero as the phase jump is then located approximately in the middle of the data on which the FFT calculation was carried out If the adjusted imaginary part is greater than the threshold value, the calculation block 24 emits a check value, which may suitably be equal to the number of samples in a period of the pilot tone, for example, four. If, on the other hand the adjusted imaginary part is smaller than the negative threshold value, the calculation block 24 in a corresponding way emits a check value k, which is, in this case minus four.

The check value k is forwarded to a counter 25 which controls when the calculation unit 22 is to perform a new FFT calculation. If the number of samples is 1024, then the counter 25 counts down from 1023+k to zero, where k is the check value. This causes the successive shifting of the start position of the FFT calculation until the phase jump is located approximately in the middle of the samples that were subjected to the FFT calculation. This may be compared to the successive FFT calculations 13a, 13b and 13c in FIG. 2a where each symbol, for clarity, only comprises 6*4=24 samples.

The symbol start needs then only be moved half a symbol to find the optimal position for the reading of the data to be transmitted.

Sampling Rate

Before the symbol rate is adjusted the sampling rate should be adjusted. The simplest way to do this is to use one of the carriers as a pilot tone, that is, transmitting a constant tone all the time, while the receiver locks to this tone.

Figure 4A:
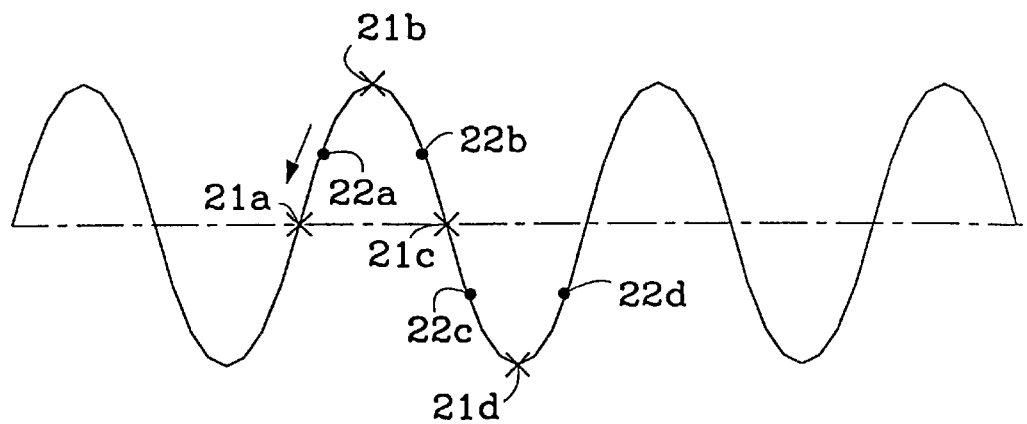
FIGS. 4a, 4b and 4c are timing diagrams of the restoration of the sampling rate according to the invention.
Figure 4B:
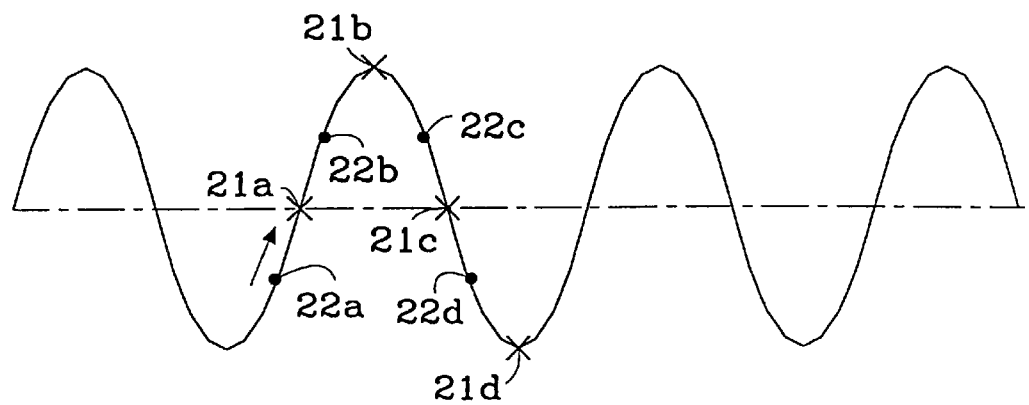
Figure 4C:
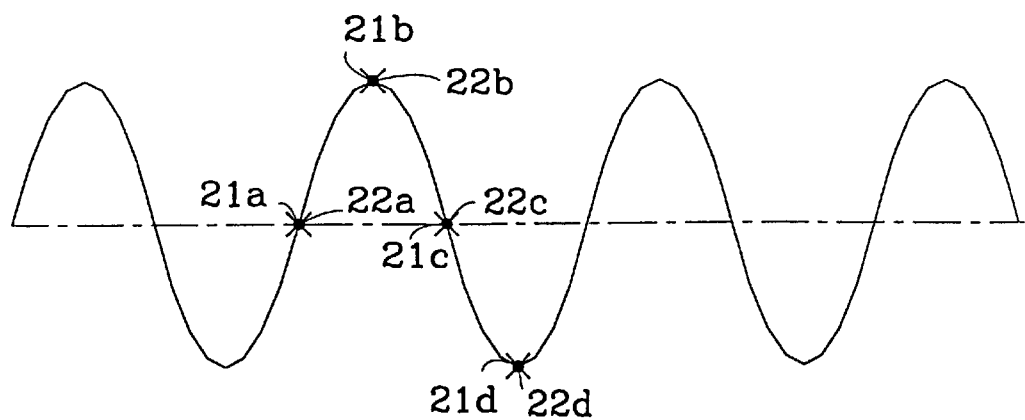

FIGS. 4a–4c show an example in which the transmitter transmits a pilot tone with four samples 21a, 21b, 21c, 21d for each period and where the receiver, in the same way, reads the pilot tone with four samples 22a, 22b, 22c, 22d for each period.

In order to synchronize the transmitter and the receiver, for every four samples one, for example sample 22a, is taken out as a first sample in the receiver. The receiver then tries to adjust the sampling of the first sample 22a so that it takes place the first time the pilot tone passes zero. If the first sample 22a is positive, the sampling is 20 shifted, so that the first sample 22a is taken a little earlier next time, see FIG. 4a. If on the other hand, the sample 22a is negative, the sampling is shifted so that the sample 22a is taken a little later next time, see FIG. 4b.

The final, desired, result is shown in FIG. 4c, in which the samples 21a, 21b, 21c, 21d and 22a, 22b, 22c, 22d of the transmitter and the receiver, respectively, are transmitted and received at approximately the same time.

Instead of the pilot tone a phase jumping pilot tone is then transmitted as training symbols as described above. In order for the adjustment of the receiver not to change directions for every other symbol, the receiver instead locks to the phase jumping pilot tone. The simplest way to achieve this is probably by adjusting the sign of the first sample 22a with the sign of a second sample 22b before or after the first sample 22a, for example, at a distance of a quarter of a period. The second sample 22b will change signs for every other symbol, which will give an indication as to whether the pilot tone being sampled is inverted or non-inverted.

Figure 5:
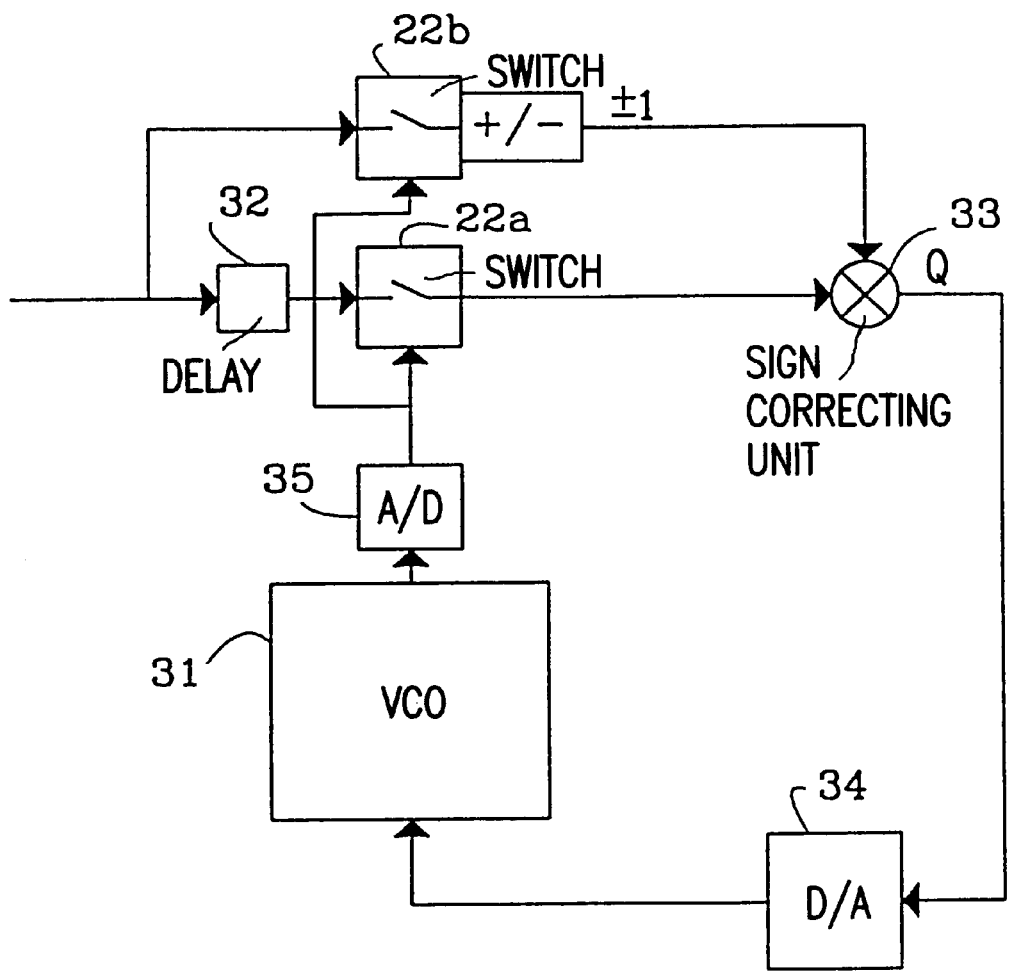
FIG. 5 is a block diagram of an embodiment of the restoration of the sampling rate according to the invention.

FIG. 5 shows, schematically, how the above may be achieved in practice. In the receiver there is a voltage controlled oscillator (VCO) 31 controlling an analogue to digital converter 35 to take a first sample 22a that is delayed in a delay circuit 32, and a second sample 22b. The sign of the second sample 22b is identified and "multiplied" with the first sample 22a in a sign correction unit 33. Of course, no real multiplication is needed; only the sign is changed, if necessary.

The sign correction unit 33 emits a control signal Q which passes a digital to analogue converter 34 and then controls the sampling through the oscillator 31 in the way described above.

Of course it is possible to instead delay the second sample 22. Then it is necessary to "multiply", in a corresponding way, the first sample 22a by the reverse sign of the second sample 22b.

During Data Transmission

The above method functions as a "training" before the transmission of data. Of course it would be possible to interrupt the data transmission from time to time at known intervals to transmit training symbols again, but it would probably be better to use a known method for the retrieval of sampling rate, for example in the frequency domain, at least if the data is to be transmitted over copper wires. If the sampling rate is locked the symbol rate will be maintained automatically. The time may then be used to transmit data symbols instead of training symbols.

These frequency domain techniques are usually slower than the method described above, but when the data transmission begins, approximately the correct sampling rate and symbol rate have already been adjusted, so that no major adjustments will be needed.

What is claimed is:

1. A device for synchronization in multi-carrier modulated communication systems, comprising:

a transmitter comprising an IFFT calculation unit, wherein the transmitter is arranged to transmit a plurality of consecutive synchronization symbols at the beginning of a transmission as training symbols, each of said synchronization symbols having a predetermined length; and a receiver comprising an FFT calculation unit, wherein the receiver is arranged to perform a series of time shifted FFT calculations over successive ones of said synchronization symbols, each of said FFT calculations being of said predetermined length;

wherein said FFT calculations are performed until a result is obtained to indicate the start of a synchronization symbol based upon said FFT calculations; and wherein, upon obtaining said result the transmitter may be arranged to transmit data symbols after the synchronization symbols.

2. A device according to claim 1, wherein the synchronization symbols each comprise at least one period of a pilot tone and the transmitter is arranged to transmit the synchronization symbols with 180° phase jumps therebetween.

3. A device according to claim 2, wherein the receiver further comprises:

a shift register connected to said FFT calculation unit for shifting sampled data;

a counter for controlling when the FFT calculation unit is to retrieve sampled data from the shift register for calculation; and a register for temporarily storing calculated data, said register being connected to a calculation block which is connected to the counter.

4. A device according to claim 2, wherein the receiver is arranged to adjust a sampling rate before adjustment of a symbol rate by locking to a simple pilot tone which the transmitter is arranged to transmit; and wherein the receiver is arranged to adjust the sampling rate during the adjustment of the symbol rate by locking to the phase jumping pilot tone which the transmitter is arranged to transmit.

5. A device according to claim 4, further comprising:

a voltage controlled oscillator in said receiver arranged to control a taking of two samples at different points in time; and a sign correcting unit arranged to emit a control signal (Q) to control the oscillator in dependence on one sample adjusted with a sign of another sample.

6. A device according to claim 1, wherein said IFFT calculation unit modulates data in the transmitter and said FFT calculation unit demodulates data in the receiver.

7. A method for synchronizing a transmitter and a receiver in multi-carrier modulated communication systems comprising steps of:

transmitting a plurality of consecutive synchronization symbols each having a same length as training symbols prior to beginning a data transmission;

performing in the receiver a series of time shifted FFT calculations on successive ones of the synchronization symbols during time intervals of said same length, wherein the FFT calculations provide an indication of where a synchronization symbol starts;

adjusting a symbol rate in the receiver based upon said indication; and transmitting from the transmitter the data transmission after the synchronization symbols.

8. A method according to claim 7, wherein said synchronization symbols each comprise at least one period of a pilot tone and there is substantially a 180° phase jump between each of said synchronization symbols.

9. A method according to claim 8, wherein said FFT calculations end upon finding a maximum value or a minimum value for one of said FFT calculations, and wherein a start of said synchronization symbol substantially coincides with a beginning of a time interval associated with either said maximum value or said minimum value.

10. A method according to claim 8, wherein said FFT calculations end upon finding one of said FFT calculations to be substantially zero, and wherein a start of said synchronization symbol substantially coincides with a middle of a time interval associated with said zero value.

11. A method according to claim 7, wherein said indication is provided by either a maximum absolute value for one of said FFT calculations or a value of zero for one of said FFT calculations.

12. A method according to claim 8, wherein a sampling rate of said receiver is adjusted before adjustment of a symbol rate of said receiver by locking to a simple pilot tone transmitted by the transmitter, and wherein said receiver adjusts the sampling rate during the adjustment of the symbol rate by locking to the pilot tone transmitted by said transmitter.

13. A method according to claim 12, wherein after a sample has been taken when the pilot tone passes zero, a control signal is modified for locking to a sign of an earlier sample or a later sample.

14. A method according to claim 7, wherein said step of transmitting comprises modulating said plurality of consecutive synchronization symbols in an IFFT calculation unit, and said receiver demodulates said plurality of consecutive synchronization symbols using an FFT calculation unit.

* * * * *